United States Patent [19]

Yamashita et al.

[11] Patent Number: 5,485,059
[45] Date of Patent: Jan. 16, 1996

[54] LIGHTING CIRCUIT FOR VEHICULAR DISCHARGE LAMP

[75] Inventors: Masayasu Yamashita; Atsushi Toda, both of Shimizu, Japan

[73] Assignee: Koito Manufacturing Co., Ltd., Tokyo, Japan

[21] Appl. No.: 80,979

[22] Filed: Jun. 30, 1993

[30] Foreign Application Priority Data

Jul. 3, 1992 [JP] Japan .................... 4-199039

[51] Int. Cl.$^6$ .................................................. H05B 37/02
[52] U.S. Cl. .................... 315/307; 315/119; 315/DIG. 7; 315/308
[58] Field of Search ................. 315/77, 82, 127, 315/225, 307, 308, 119, DIG. 7

[56] References Cited

U.S. PATENT DOCUMENTS

| | | | |
|---|---|---|---|
| 4,392,087 | 6/1983 | Zansky | 315/219 |
| 4,455,509 | 6/1984 | Crum et al. | 315/119 |
| 4,904,907 | 2/1990 | Allison et al. | 315/307 |
| 4,952,849 | 8/1990 | Fellows et al. | 315/307 |
| 4,980,611 | 12/1990 | Orenstein | 315/225 |
| 4,992,702 | 2/1991 | Shimizu et al. | 315/219 |
| 5,103,143 | 4/1992 | Daub | 315/308 |
| 5,140,229 | 8/1992 | Yagi et al. | 315/307 |
| 5,142,203 | 8/1992 | Oda et al. | 315/308 |
| 5,151,631 | 9/1992 | Oda et al. | 315/308 |
| 5,212,428 | 5/1993 | Sasaki et al. | 315/82 |
| 5,241,242 | 8/1993 | Daub | 315/82 |

*Primary Examiner*—Robert J. Pascal
*Assistant Examiner*—Darius Gambino
*Attorney, Agent, or Firm*—Sughrue, Mion, Zinn, Macpeak & Seas

[57] ABSTRACT

Disclosed is a lighting circuit for a vehicular discharge lamp, which can accurately and promptly detect an abnormal status to thereby improve the reliability and safety usage. When a lighting switch in the lighting circuit is set on, a batter/voltage is boosted by a DC booster circuit and then converted into an AC voltage by a DC/AC converter before being supplied to a metal halide lamp. When power supply continues with the lamp in an open-circuit state or a short-circuited state, a fire may be set or an electric-shock originated accident may occur. An abnormality detector for detecting an abnormal status is provided to cope with such a problem. The abnormality detector detects the output voltage of the DC/AC converter, very close to the lamp voltage, determines that the lamp in the open-circuit state when the detected level is equal to or above a predetermined value and determines that the lamp in the short-circuited state when the detected level is equal to or below a predetermined value. The abnormality detector sends an abnormality detection signal to apower cutoff relay circuit to open its relay contact on the power line to cut off power supply to the DC booster circuit. The short-circuited state/of the lamp can also be determined by monitoring individual voltages applied to both terminals of the lamp and comparing those voltages with each other.

15 Claims, 10 Drawing Sheets

FIG.11 ns, a possibility of causing dangerous fire increases, or a user may attempt to replace the discharge lamp with a new one without knowing that a high voltage is applied to the discharge lamp, resulting in an electric-shock oriented accident.

LIGHTING CIRCUIT FOR VEHICULAR DISCHARGE LAMP

BACKGROUND OF THE INVENTION

Field of the Invention

The present invention generally relates to a novel lighting circuit for a vehicular discharge lamp, which can accurately detect an abnormal status of the lamp to protect the circuit and prevent an accident from occurring from electric shocks, thereby improving the reliability and safe use of the discharge lamp.

Description of the Related Art

Compact metal halide lamps have recently been receiving greater attention as a light source that can replace an incandescent lamp. A known lighting circuit for a vehicular metal halide lamp uses a DC power source, boosts the DC input voltage by a booster circuit and then converts the boosted voltage into an AC voltage of a sine waveform or rectangular waveform by a DC/AC converter before applying the voltage to the metal halide lamp.

There are still some safety problems concerning the lighting of a discharge lamp as follows. There may be a case where some abnormality occurs during the lighting duration of the discharge lamp, e.g., when the discharge lamp becomes an open circuit or the discharge lamp is short-circuited with the body of the vehicle. If power is kept supplied to the discharge lamp under such abnormal conditions, a possibility of causing dangerous fire increases, or a user may attempt to replace the discharge lamp with a new one without knowing that a high voltage is applied to the discharge lamp, resulting in an electric-shock oriented accident.

It is therefore necessary to accurately detect such an abnormal condition and take the proper safety measure. As one solution, the control status of the circuit may be monitored constantly to detect the occurrence of any abnormal status. The accurate detection of abnormality is still difficult due to the influence of the temperature characteristic of semiconductor switch elements which constitute the control circuit and power supply circuit.

SUMMARY OF THE INVENTION

Accordingly, it is an object of the present invention to provide an improved lighting circuit for a vehicular discharge lamp, which can overcome the above shortcomings.

To achieve the object, according to a first aspect of the present invention, there is provided a lighting circuit for a vehicular discharge lamp, which comprises DC/AC converting means for converting a DC voltage into an AC voltage before and supplying the AC voltage to a discharge lamp; abnormality detecting means for detecting a level of a lamp voltage of the discharge lamp or a corresponding signal and comparing the detected level with a level of a predetermined reference voltage or checking if the detected level falls within a predetermined reference range to thereby discriminate an abnormal status of the discharge lamp; and power cutoff means for cutting off power supply to the discharge lamp when receiving a signal indicating an abnormal status from the abnormality detecting means.

According to a second aspect of this discharge lamp, there is provided a lighting circuit for a vehicular discharge lamp, which comprises DC/AC converting means for converting a DC voltage into an AC voltage before and supplying the AC voltage to a discharge lamp, abnormality detecting means for detecting a level of a lamp voltage of the discharge lamp or a corresponding Signal and comparing detected levels acquired for individual terminals of the discharge lamp with each other to thereby discriminate an abnormal status of the discharge lamp; and power cutoff means for cutting off power supply to the discharge lamp when receiving a signal indicating an abnormal status from the abnormality detecting means.

According to the present invention, the lamp voltage of a discharge lamp or its corresponding signal is always monitored and the detected level is compared with the level of a reference voltage or the detected levels acquired for the individual terminals of the discharge lamp are compared with each other, and power supply to the discharge lamp is cut off when an abnormal status is detected. It is therefore possible to carry out abnormality detection which reflects the status of the discharge lamp at high fidelity, quickly detect the occurrence of an abnormality and eliminate the dependency of the precision of abnormality detection on the temperature characteristic of a semiconductor switch element.

BRIEF DESCRIPTION OF THE DRAWINGS

FIGS. 9(a)–9(b) present time charts for explaining abnormality detection according to the second embodiment, FIG. 9A showing a normal status while

DETAILED DESCRIPTION OF THE PREFERRED EMBODIMENTS

Preferred embodiments of a lighting circuit for a vehicular discharge lamp according to the present invention will be described in detail below with reference to the accompanying drawings. The illustrated embodiments of this invention are lighting circuits of a rectangular-wave triggering system.

FIGS. 1 through 7 illustrate a first embodiment of the present invention.

Figure 1:
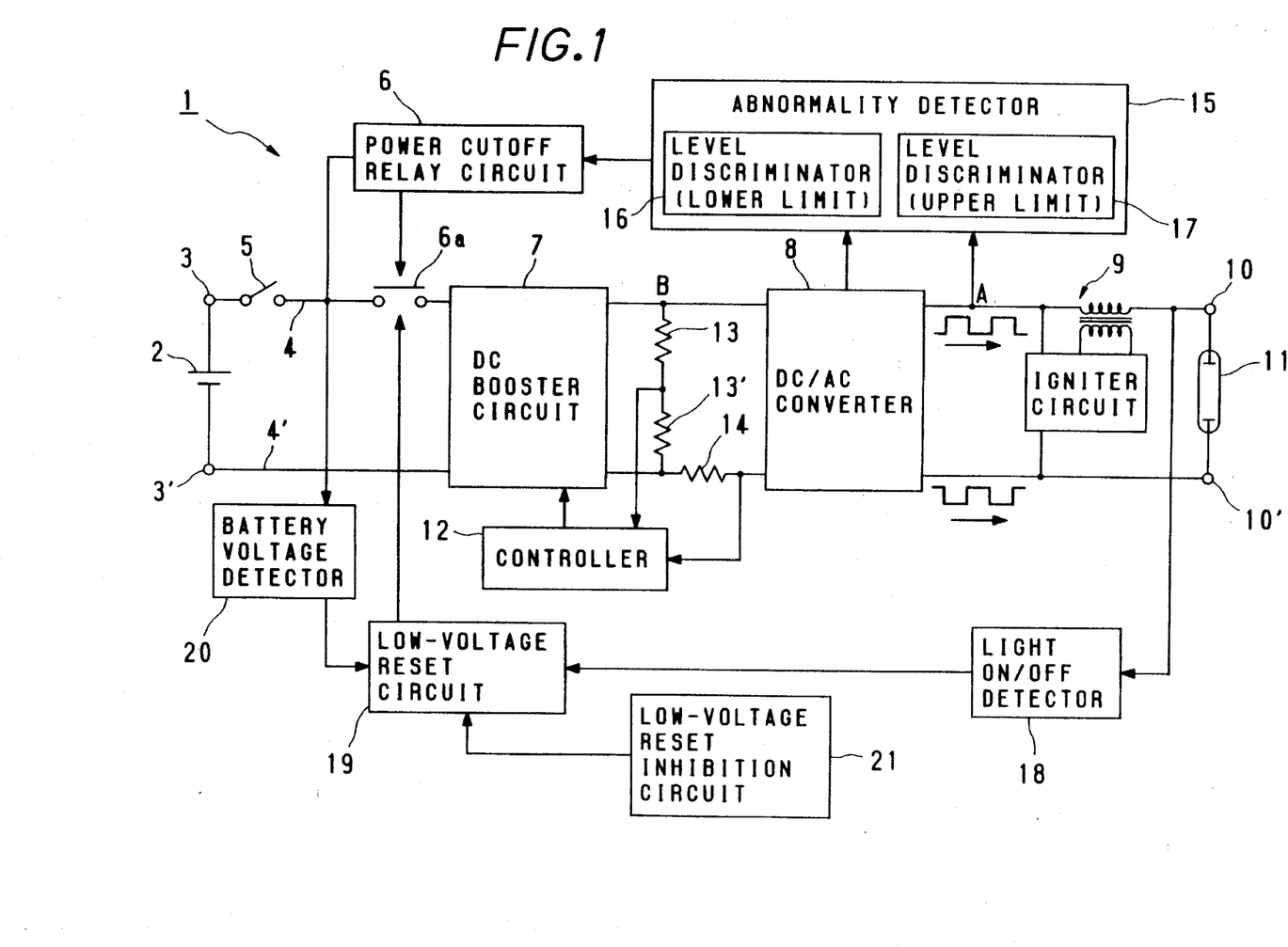
FIG. 1 is a block diagram illustrating the schematic structure of a fighting circuit for a vehicular discharge lamp according to a first embodiment of the present invention.

FIG. 1 presents schematic illustration of a lighting circuit 1. The lighting circuit 1 has a battery 2, connected between DC voltage input terminals 3 and 3', a lighting switch 5, a power cutoff relay circuit 6, a DC booster circuit 7, a DC/AC converter 8, an igniter circuit 9, a control circuit 12, and an abnormality detector 15. Reference numerals 4 and 4' denote DC power supply lines. The lighting switch 5 is inserted in the positive power line 4.

A relay contact 6a is provided on the positive power line 4, and is open and closed by a power cutoff relay circuit 6. That is, the power cutoff relay circuit 6 serves to cut off the supply of a battery voltage to circuits at the subsequent stages when abnormality in the lighting circuit I is detected.

The DC booster circuit 7 has its positive input terminal connected to the output terminal of the relay contact 6a and the other ground input terminal connected to the DC voltage input terminal 3'.

The DC booster circuit 7 serves to boost the battery voltage under the control of the control circuit 12 which will be described in detail later.

The DC/AC converter 8 is provided at the subsequent stage of the DC booster circuit 7 to convert the DC voltage from the booster circuit 7 into an AC voltage of a rectangular waveform. A bridge type driving circuit is used for this DC/AC converter S.

The igniter circuit 9 is provided at the subsequent stage of the DC/AC converter 8. A metal halide lamp 11 having rated power of 35 W is connected between AC output lines 10 and 10' of the igniter circuit 9.

The control circuit 12 serves to control the output voltage of the DC booster circuit 7. The control circuit 12 receives a voltage detection signal corresponding to the output voltage of the DC booster circuit 7 which is detected by voltage-dividing resisters 13 and 13' provided between the output terminals of the DC booster circuit 7.

The control circuit 12 also receives a current detection signal, which corresponds to the output current of the DC booster circuit 7 converted into a voltage form by a current-detecting resistor 14.

The control circuit 12 generates control signals according to these detection signals, and sends the control signals to the DC booster circuit 7 to control the output voltage of the circuit 7, thereby performing power control matching the status of the metal halide lamp 11 at the time of activation.

The abnormality detector 15 constantly monitors the output voltage of the DC/AC converter 8 to protect the circuit and prevent abnormality-originated accidents.

The following are possible abnormal statuses.

(1) The lamp is in an open-circuit state.

(2) The lamp is in a short-circuited state.

(3) The lamp is short-circuited with the body of the vehicle.

If power supply to the lamp continues under those conditions, heat may be generated from the circuit and around that circuit, causing a fire or electric-shock oriented accidents may occur.

To quickly and accurately detect an abnormality under the above conditions, the position of the detection is selected at the output stage of the DC/AC converter 8 as indicated by a point A in FIG. 1 (or at any position where an equivalent signal can be obtained). Upon detection of any of the aforementioned abnormalities, the abnormality detector 15 sends a control signal to the power cutoff relay circuit 6 to cut off the power supply to the DC booster circuit 7 from the battery 2.

While the lamp voltage of the lamp 11 is a direct reference to discriminate the abnormality, the rectangular waveform output from the DC/AC converter 8 is supplied via an inductor of the igniter circuit 9 to the lamp and nearly equals the lamp voltage. It is therefore suitable to monitor this rectangular waveform in order to grasp the lamp status.

If the position of abnormality detection is taken at the output stage of the DC booster circuit 7 as indicated by a point B in FIG. 1, a sufficient margin for detection cannot be taken due to the temperature characteristic of the semiconductor switch element. This makes it difficult to accurately distinguish the normal status from an abnormal status, probably resulting in erroneous detection.

Figure 2:
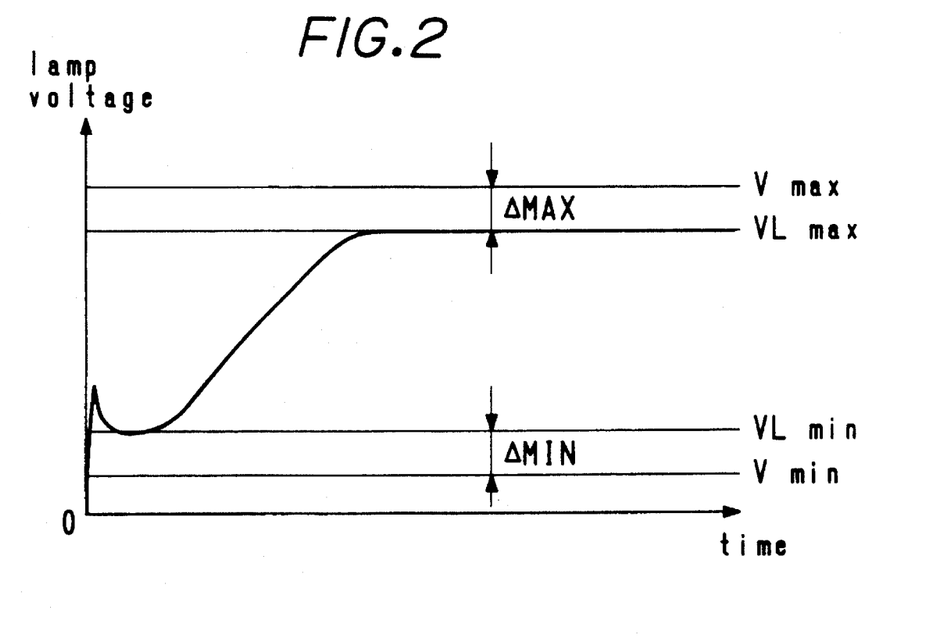
FIG. 2 is a graph schematically illustrating a time-dependent change in the lamp voltage of a discharge lamp.

The lamp voltage is small at the beginning of the lighting and increases with time to become a steady value at a certain voltage.

In the abnormal case (1), the output voltage of the DC/AC converter 8 is the highest and the potential at a point A increases to the limit of the performance of the DC booster circuit 7.

In the abnormal oases of (2) and (3), the potential at a point A is almost zero.

Given that the minimum value of the Imp voltage is "VLmin" and the maximum value of the lamp voltage is "VLmax," a threshold value Vmin (=VLmax−ΔMIN), obtained by subtracting the margin "ΔMIN" from the minimum value VLmin, is set, and a threshold value Vmax (=VLmax+ ΔMAX), obtained by adding the margin "ΔMIN" to the minimum value VLmin, is set. Then, the detected voltage is compared with those threshold values to discriminate if abnormality has occurred.

Given that the output voltage of the DC/AC converter 8 is set to "VL", lamp status is discriminated as a short-circuited status as of the case (2) or (3) when VL≦Vmin, and is discriminated as an open-circuit status as of the case (1) when VL≧Vmax.

The abnormality detector 15 has two level discriminating sections 16 and 17, which are designed for those classifications. The first circuit 16 discriminates the lower limit of the lamp voltage while the other circuit 17 discriminates the upper limit of the lamp voltage.

Reference numeral "18" denotes a light ON/OFF detector, which detects the lamp current to determine if the metal halide lamp 11 has been lit, and sends a detection signal corresponding to the discrimination result to a low-voltage reset circuit 19.

When detecting that the battery voltage becomes abnormally low in accordance with a signal from a battery voltage detector 20, which monitors the value of the battery voltage, the low-voltage reset circuit 19 considers that no further lighting of the lamp is possible and opens the relay contact 6a to temporarily stop supplying the battery voltage to the DC booster circuit 7.

This operation is executed only when the low-voltage reset circuit 19 is informed of the OFF state of the lamp by the detection signal from the light ON/OFF detector 18.

In other words, the low-voltage reset circuit 19 does not determine from the level of the battery voltage alone, whether power supply to the DC booster circuit 7 is to be permitted or inhibited. Rather, the low-voltage reset circuit 19 constantly monitors the lighting status of the lamp to find when the lamp is in an OFF status, determines if the battery voltage is equal to or below the battery voltage only after detecting the OFF status of the lamp, and then discriminates whether the supply of the battery voltage to the power feeding system should be permitted or inhibited.

Reference numeral "21" is a low-voltage reset inhibiting circuit which inhibits the low-voltage reset function to forcibly light the lamp while a predetermined time elapses after the lighting switch 5 is set ON.

The low-voltage reset function is to determine that no further lighting of the lamp is possible when the voltage from the battery 2 is equal to or below a given value and lighting failure of the lamp occurs, and to interrupt the lighting until the supplied voltage recovers. When the supplied voltage is equal to or below a predetermined value immediate after the lighting switch 5 has been set ON, the lamp is not easily lit, and the light ON and light OFF statuses may repeatedly occur in the transient period until the lamp status becomes a steady lighting state. If the low-voltage reset function is activated under this situation, a chance of lighting the lamp may be taken away. Accordingly, the low-voltage reset function is disabled until a predetermined period of time elapses after the activation of the lighting switch 5, thus permitting the lamp to be lit as much as possible.

A detailed description will now be given of an example of the structure of the abnormality detector 15 in the lighting circuit 1 and the structure of the essential portions of the power feeding system.

Figure 3A:
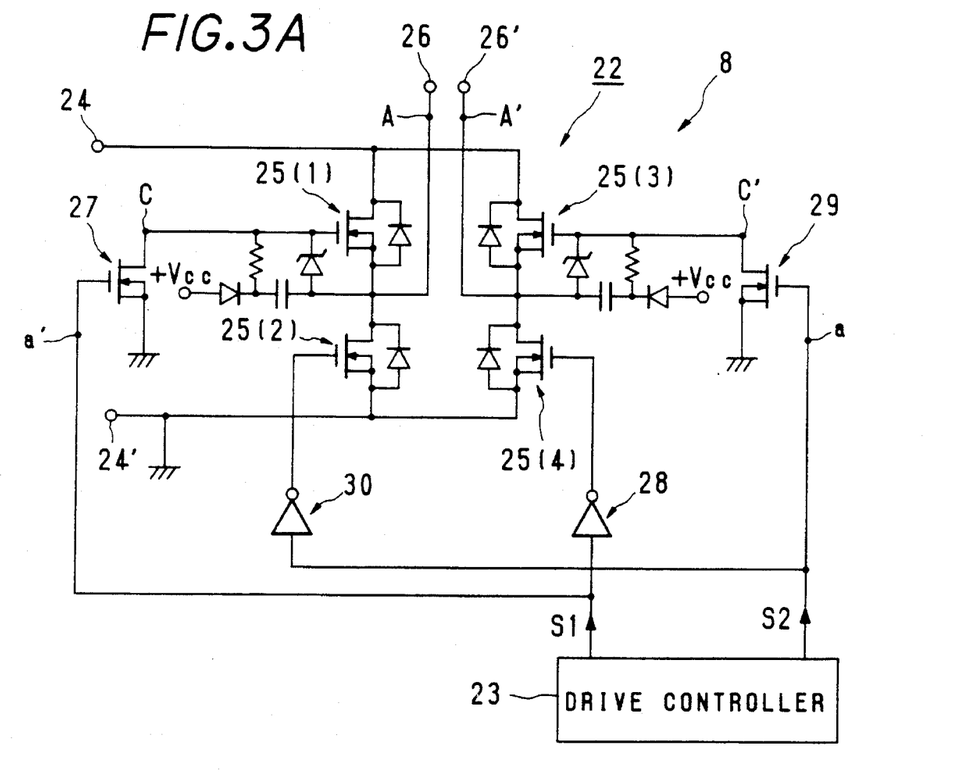
FIGS. 3(a)–3(b) exemplify the structure of a DC/AC converter, FIG. 3A presenting a circuit diagram of the DC/AC converter and FIG. 3B presenting a time chart showing control signals to an FET (Field Effect Transistor)

FIG. 3A illustrates the essential portions of the DC/AC converter 8.

The DC/AC converter 8 comprises a bridge type driver 22 using FETs and a drive controller 23 for sending a switching control signal to the FETs.

The output voltage of the DC booster circuit 7 is input to DC voltage input terminals 24 and 24', the terminal 24 being a positive input terminal while the terminal 24' is a ground input terminal. Four N channel FETs 25($i$) constitute the bridge type driver 22 ($i$=1, 2, 3, 4). Of those FETs, the FETs 25(1) and 25(2) are connected in series, and the FETs 25(3) and 25(4) are connected in series. The two series circuits of the FETs are arranged in parallel to each other.

The FET 25(1), on the high stage side, has its drain connected to the positive input terminal 24 and its source connected to the drain of the FET 25(2), on the low stage side, whose source is connected to the ground input terminal 24'.

With regard to the FETs 25(3) and 25(4) connected in parallel to the FETs 25(1) and 25(2), the FET 25(3), on the high stag side, has its drain connected to the positive input terminal 24 and its source connected to the drain of the FET 25(4), on the low stage side, whose source is also connected to the ground input terminal 24'.

Zener diodes are respectively inserted between the gate and source of the FET 25(1) and between those of the FET 25(3), with a capacitor and a resistor provided between the anode of each Zener diode and the gate of the associated FET. A predetermined voltage (+Vcc) is applied via a diode between each capacitor and the associated resistor.

An output terminal 26 is connected to the source of the FET 25(1), while another output terminal 26' is connected to the source of the FET 25(3).

Point A in the diagram shows the position of the detection of abnormality.

To control the switching of the FETs 250), the drive controller 23 sends control signals S1 and S2 to the individual FETs in such a way as to reciprocally control the FETs with those FETs located diagonally opposite to each other taken as a pair.

More specifically, the drive controller 23 sends the control signals, which have a reciprocal relation with each other, to the associated FETs via FETs or inverter circuits. The switching control is performed with the FETs 25(1) and 25(4) taken as a pair and the FETs 25(2) and FET 25(3) as another pair.

The control signal S1 is sent to the gate of the FET 25(4) via an inverter circuit 28 as well as to the gate of the FET 25(1) via an FET 27. The other control signal S2 is sent to the gate of the FET 25(2) via an inverter circuit 30 as well as to the gate of the FET 25(3) via an FET 29.

Figure 3B:
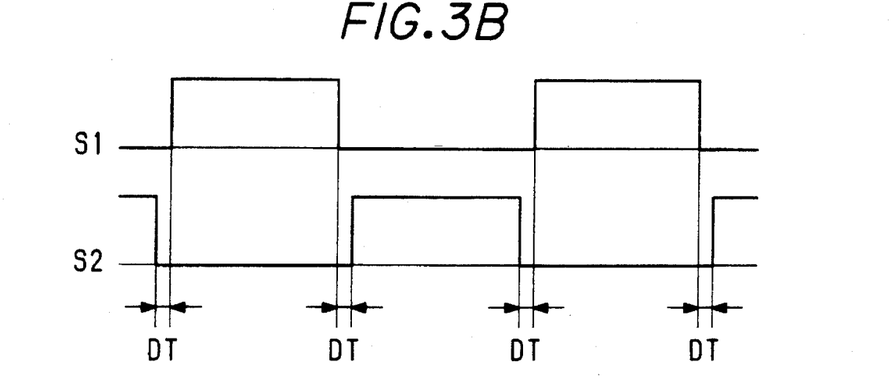

FIG. 3B illustrates the phase relationship between the control signals S1 and S2. A dead time DT at which all the FETs are simultaneously turned off is included in the switching period in the switching control to create no period in which all the FETs are simultaneously turned on during the switching of the FETs.

Figure 4:
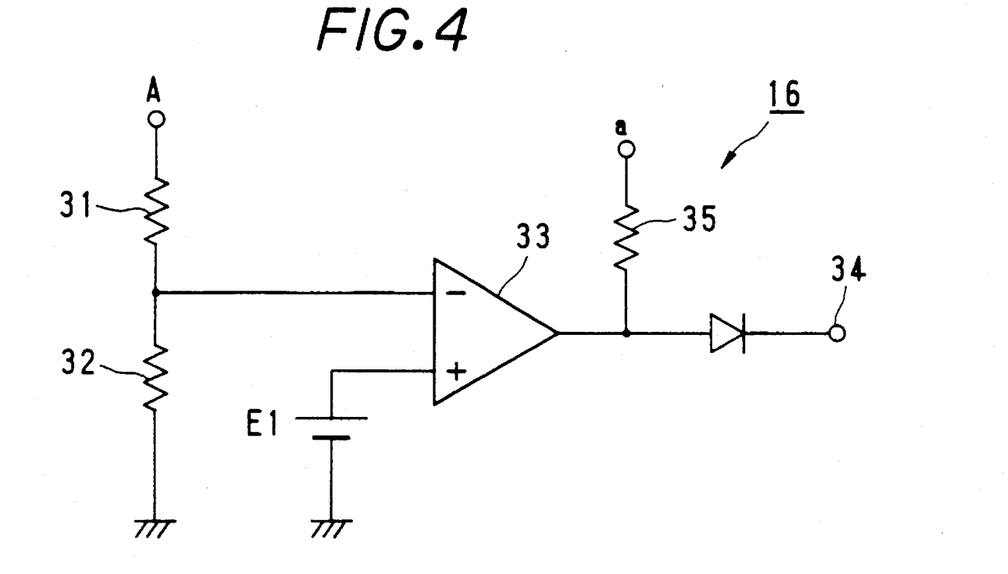
FIG. 4 is a circuit diagram showing an example of the structure of an abnormality detector which detects the short-circuited state of a discharge lamp.

FIG. 4 illustrates an example of the structure of the abnormality detector 15.

As described earlier, the position of the detection of abnormality in the cases (2) and (3) is the output terminal 26 of the bridge type driver 22 or the point A, and the output voltage divided by the voltage-dividing resisters 31 and 32 is input to the inverting input terminal of an operational amplifier 33.

The non-inverting input terminal of the operational amplifier 33 is applied with a predetermined reference voltage (indicated by a voltage source El). This reference voltage corresponds to the aforementioned threshold value Vmin.

The output terminal of the operational amplifier 33 is connected via a diode to a detection output terminal 34.

The output of the operational amplifier 33 is an open-collector, and the output terminal thereof is also connected to the gate of the FET 29 (indicated by a point a in FIG. 3) via a resistor 35.

In other words, the detection signal at the point A and the signal at the point a, which is in phase with the former signal, are selected.

When an abnormal status occurs, the voltage of a rectangular waveform at the point A becomes smaller than the reference voltage E1 and the detection signal era rectangular waveform in phase of the detected voltage can be acquired from the detection output terminal 34. In the normal status, as the voltage of a rectangular waveform at the point A becomes larger the reference voltage E1, the output of the operational amplifier 33 and the detection signal at the point a are in the opposite phases, so that the detection output becomes a low (L) signal.

While the level discriminating section 16 detects the short-circuited status at one terminal of the metal halide lamp 11, the detection of the short-circuited status at both ends of the lamp may be carded out by additionally providing a level discriminating section having the same circuit structure as the one shown in FIG. 4. In this case, a point a' on the output terminal side should be taken as the position of the detection of a rectangular waveform and the drive signal for the FET 27, which becomes in phase with the detection signal, i.e., the potential at a point a' should only be applied to the output terminal of the operational amplifier.

Figure 5:
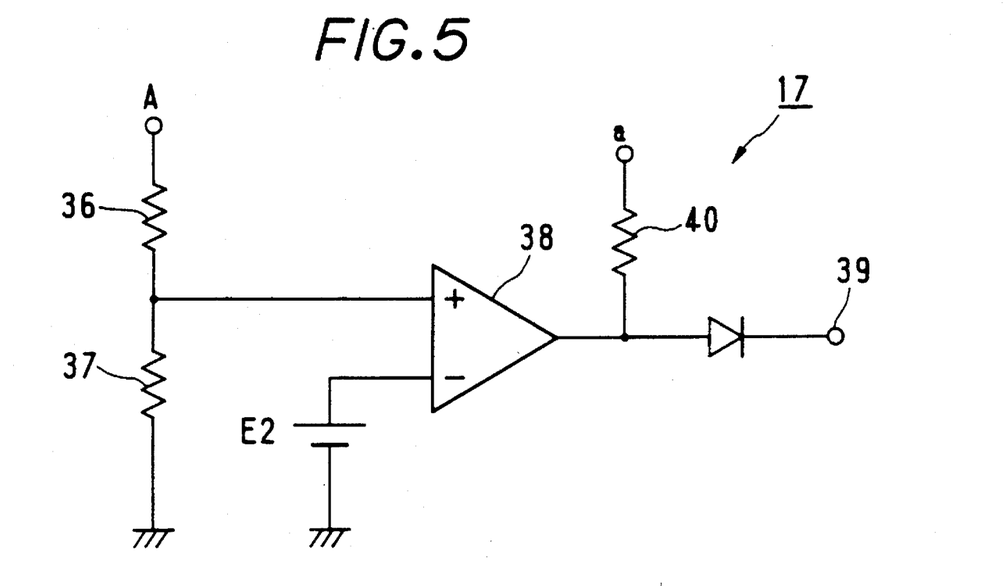
FIG. 5 is a circuit diagram showing an example of the structure of an abnormality detector which detects the open-circuit state of the discharge lamp.

FIG. 5 shows an example of the structure of the level discriminating section 17 in the abnormality detector 15, which detects the abnormal status of the aforementioned case (1). This level discriminating section 17 differs from the above-described circuit 16 only in the sign of the signal, which is to be input to the operational amplifier, and the reference voltage, and the other portion is the same as that of the circuit 16.

In this case too, the point A is selected as the position of the detection of abnormality, and the output voltage era rectangular waveform divided by voltage-dividing resisters 36 and 37 is input to the non-inverting input terminal of an operational amplifier 38.

The inverting input terminal of the operational amplifier 38 is applied with a predetermined reference voltage (indicated by a voltage source E2). This reference voltage corresponds to the aforementioned threshold value Vmax.

The output terminal of the operational amplifier 38 is connected via a diode to a detection output terminal 39.

The output of the operational amplifier 38 is an open-collector, and the output terminal thereof is also connected via a resistor 40 to the gate of the FET 29 or the point a at which a signal in phase with the detection signal at the point A can be obtained.

When an abnormal status occurs, the voltage of a rectangular waveform at the point A becomes greater than the reference voltage E2 and the detection signal of a rectangular waveform in phase of the detected voltage can be acquired from the detection output terminal 39.

In the normal status, as the voltage of a rectangular waveform at the point A is smaller than the reference voltage E2, the output of the operational amplifier 33 and the detection signal at the point a are in the opposite phases, so that the detection output becomes an L signal.

The individual abnormality signals detected in the above manner are ORed, and the resultant signal is finally sent to the power cutoff relay circuit 6 which uses the signal to open the relay contact 6a.

Figure 6:
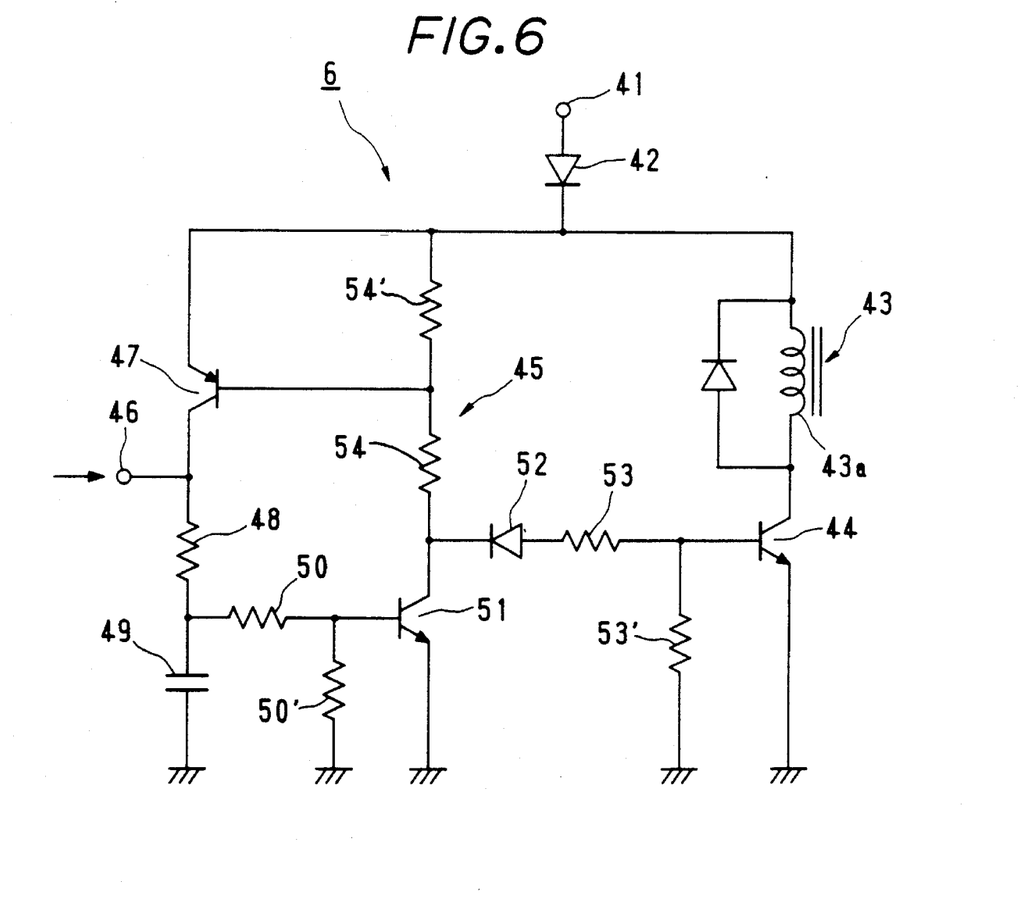
FIG. 6 is a circuit diagram exemplifying the structure of a power cutoff relay circuit shown in FIG. 1.

FIG. 6 exemplifies the structure of the power cutoff relay circuit 6.

A power terminal 41 is connected to the output terminal of the lighting switch 5 via a reverse-voltage preventing diode 42. A relay 43 has a coil 43a, which has one end connected to the power terminal 41 and the other end connected to the collector of an NPN transistor 44. The relay contact 6a is open or closed in accordance with whether the coil 43 a is excited.

A signal holding circuit 45 receives the aforementioned abnormality detection signal at its input terminal 46. The signal holding circuit 45 is designed so that when the potential at the input terminal 46 becomes a high (H) level, this status is held and the transistor 44 is turned off.

As illustrated, the input terminal 46 is connected to the collector of an emitter-grounded PNP transistor 47, and this collector is grounded via a resistor 48 and a capacitor 49 and connected to the base of an NPN transistor 51 via resisters 48 and 50. Provided between the base and collector of the transistor 51 is a resistor 50'.

The collector of the emitter-grounded NPN transistor 51 is connected via a diode 52 and a resistor 53 to the base of the transistor 44, and is connected via resisters 54 and 54' to the cathode of the diode 42. The node between the resisters 54 and 54' is connected to the base of the PNP transistor 47.

Provided between the base and emitter of the transistor 44 is a resistor 53'.

When an H signal is input to the input terminal 46, the transistors 51 and 47 are turned on and this status is held, thus turning off the transistor 44.

Consequently, the relay 43 is mined off, stopping the power supply to the DC booster circuit 7. This condition continues unless the lighting switch 5 is put on again after being temporarily turned off.

Figure 7:
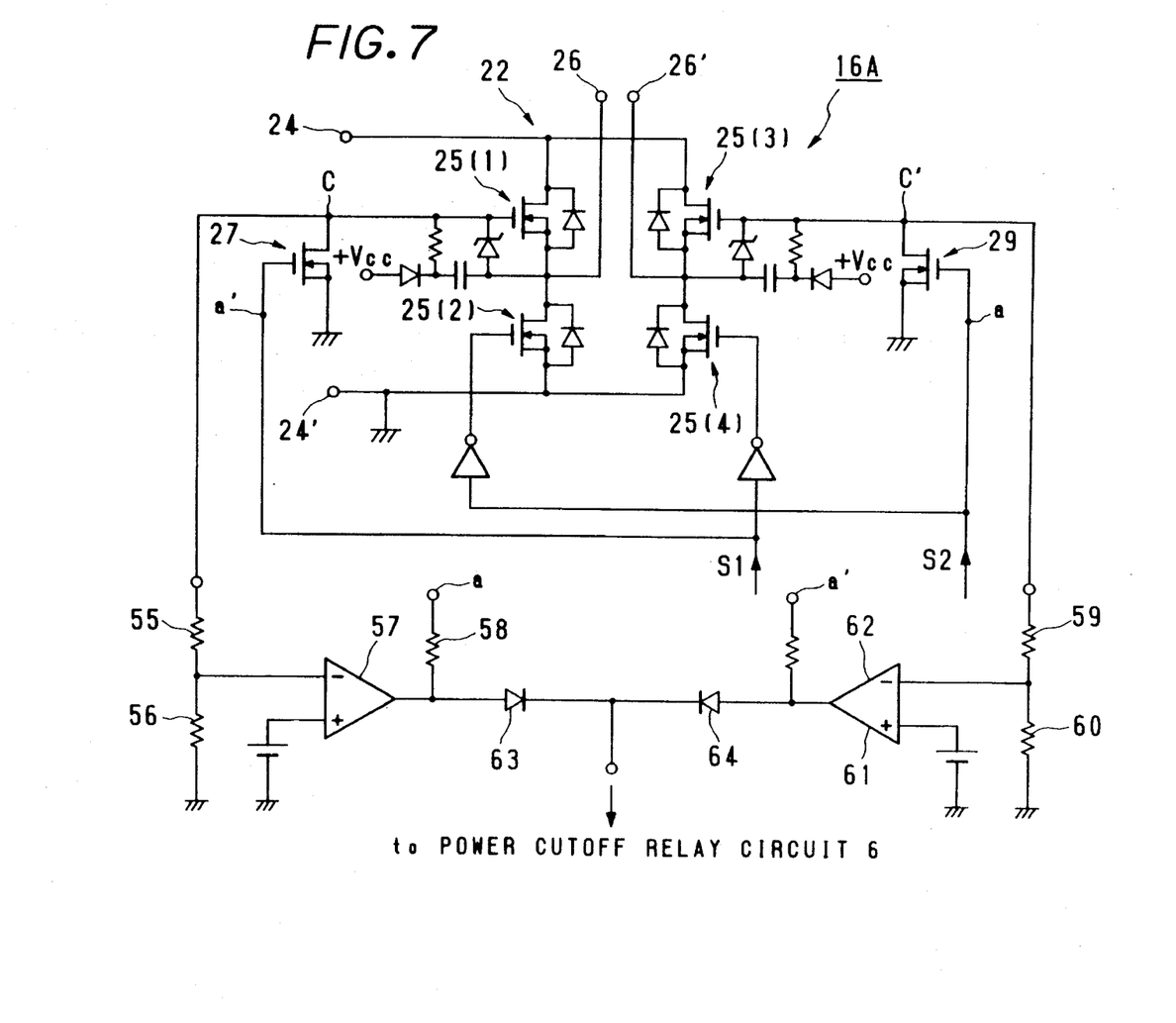
FIG. 7 is a circuit diagram showing a modification of the abnormality detector which detects the short-circuited state of a discharge lamp.

FIG. 7 shows a modification 16A of the level discriminating level section.

While the above-described level discriminating section 16 takes the point A, the output of the bridge circuit, as the position of detection, the restriction on this position of detection can be relaxed if a signal equivalent to the signal of a rectangular waveform can be utilized.

As an output in phase with the detection signal at the point A can be acquired from the gate (indicated by a point C in FIG. 3) of the FET 25(1) in the circuit shown in this diagram, the abnormal statuses (2) and (3) can be detected by detecting that output and comparing it with a predetermined reference voltage.

As illustrated, the gate voltage at the point C divided by voltage-dividing resisters 55 and 56 is input to the inverting input terminal of an operational amplifier 57. The non-inverting input terminal of the operational amplifier 57 is applied with a predetermined reference voltage (corresponding to the threshold value Vmin).

The output of the operational amplifier 57 is an open-collector, and the output terminal thereof is supplied through a resistor 58 with a signal from the gate of the FET 29 or a signal at the point a where a signal in phase with the detection signal at the point C can be obtained.

A circuit for detecting the potential at the gate (indicated by a point C' in the diagram) of the FET 25(3), which is in phase with the signal at the point A' on the output terminal of the bridge type driver 22, is provided to make a pair with the above circuit. The gate voltage at the point C' divided by voltage-dividing resisters 59 and 60 is input to the inverting input terminal of an operational amplifier 61. The non-inverting input terminal of the operational amplifier 61 is applied with a predetermined reference voltage (corresponding to the threshold value Vmin).

The output of the operational amplifier 61 is an open-collector, and the output terminal thereof is supplied through a resistor 62 with a signal from the gate of the FET 27 or a signal at the point a' where a signal in phase with the detection signal at the point C can be obtained.

The outputs of those operational amplifiers 57 and 61 are ORed by diodes 63 and 64 and the resultant signal is sent to the power cutoff relay circuit 6.

The operation of the above-described circuit is the same as the previous circuit, so that when an abnormality (2) or (3) occurs, an abnormality detection signal of a rectangular waveform is sent to the power cutoff relay circuit 6 and held there and the relay 43 is set off to open the contact 6a.

FIGS. 8 through 11 illustrate a lighting circuit 1A for a vehicular discharge lamp according to a second embodiment of the present invention.

Figure 8:
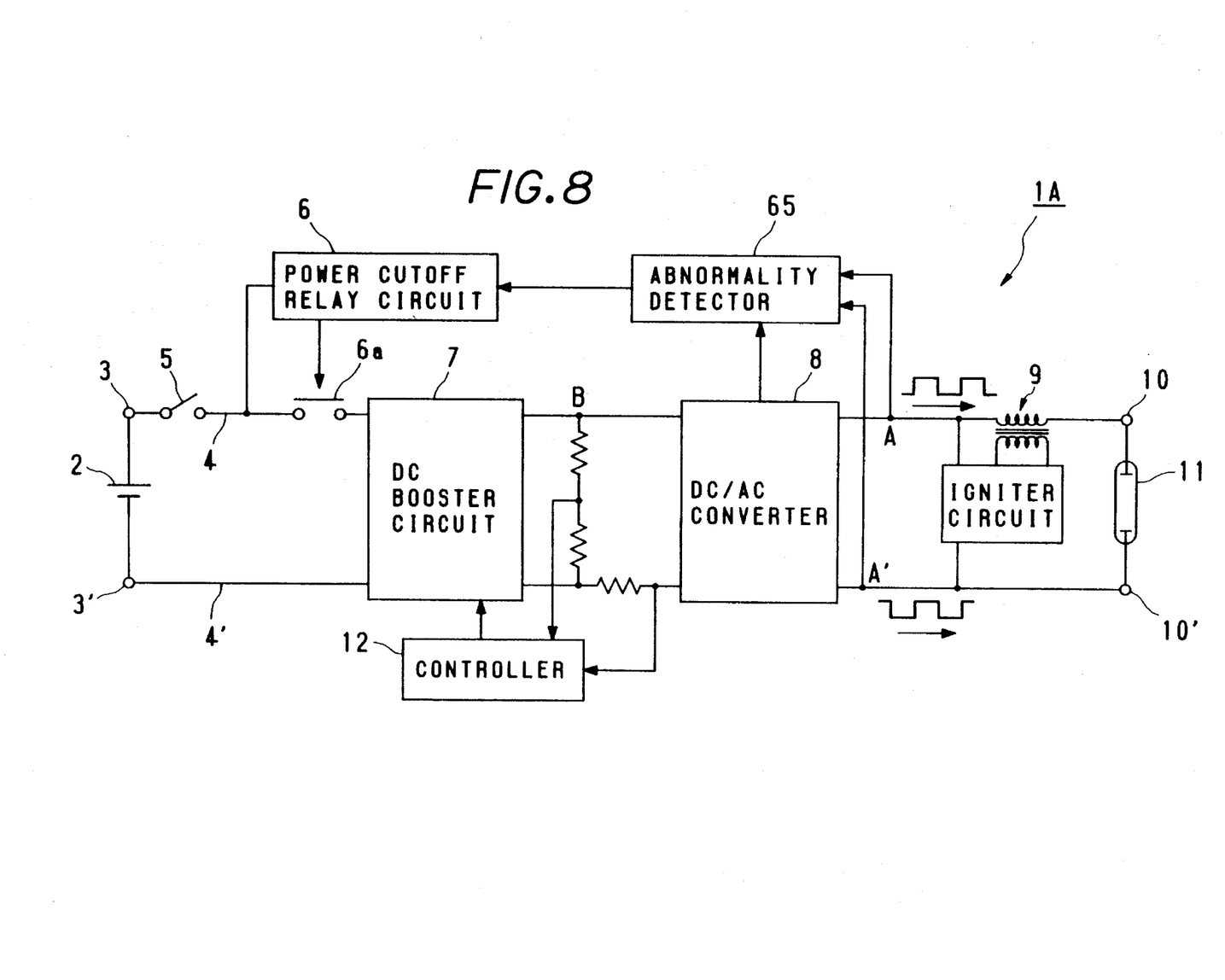
FIG. 8 is a block diagram illustrating the schematic structure of a lighting circuit for a vehicular discharge lamp according to a second embodiment of the present invention.

The lighting circuit 1A for a vehicular discharge lamp according to the second embodiment differs from that of the first embodiment in that the abnormal status is discriminated by detecting if the output voltage of the DC/AC converter 8 falls within a predetermined range in the first embodiment, whereas voltages of a rectangular waveform at the points A and A' on the output terminal of the DC/AC converter 8 are compared with each other to detect an abnormal status in the second embodiment.

Like or same reference numerals as used for the components of the first embodiment will be given to denote corresponding or identical components in the second embodiment to thereby avoid their redundant descriptions.

FIG. 8 illustrates the structure of the lighting circuit 1A. After the voltage from the battery 2 is sent via the lighting switch 5 to the DC booster circuit 7, it is converted into a voltage of a rectangular waveform by the DC/AC converter 8 and is then applied via an inductor of the igniter circuit 9 to the metal halide lamp 11.

An abnormality detector 65 detects the output of the DC/AC converter 8, i.e., the potentials at the points A and A', and compares both with each other to determine if the aforementioned abnormal status (3) has occurred, and sends the result to the power cutoff relay circuit 6.

Figure 9A:
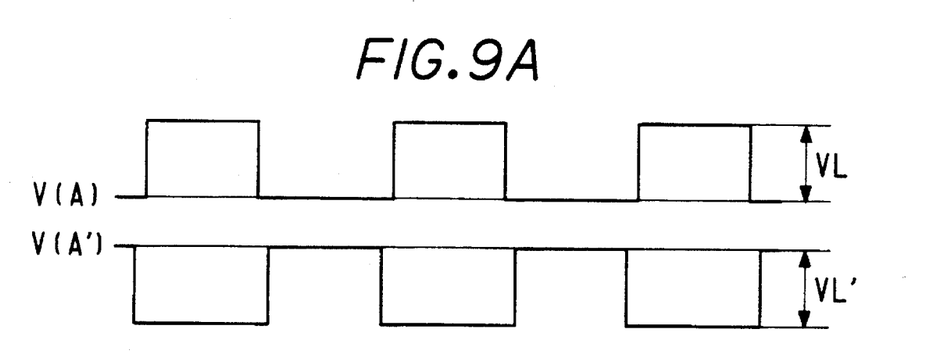
Figure 9B:
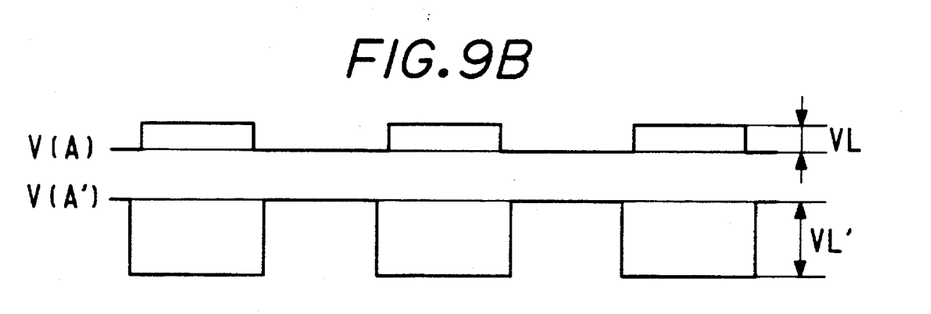
FIG. 9B shows an abnormal status.

FIG. 9A shows the detected voltage V(A) at the point A and the detected voltage V(A') at the point A' in the normal status, while FIG. 9B shows the detected voltage V(A) at the point A and the detected voltage V(AD at the point A' in the case where a half side of the lamp, for example, the lamp on the point A side is short-circuit with the body of the vehicle. The waveforms of those detected voltages indicate waveforms for the ground (vehicle's body).

In the diagrams, "VL" indicates the amplitude of the detected voltage V(A) and "VL'" indicates the amplitude of the detected voltage V(A'). While VL and VL' are nearly equal to the lamp voltage in the normal status as shown in FIG. 9A, VL<<VL' as shown in FIG. 9B when one end of the lamp is short-circuited.

Although not illustrated, when the other end of the lamp is short-circuited, VL>>VL', and their waveforms hold the opposite relationships with those of V(A) and V(A').

The occurrence of an abnormal status can be detected by comparing the amplitudes of the detected voltages at the detection points A and A' with each other.

Figure 10:
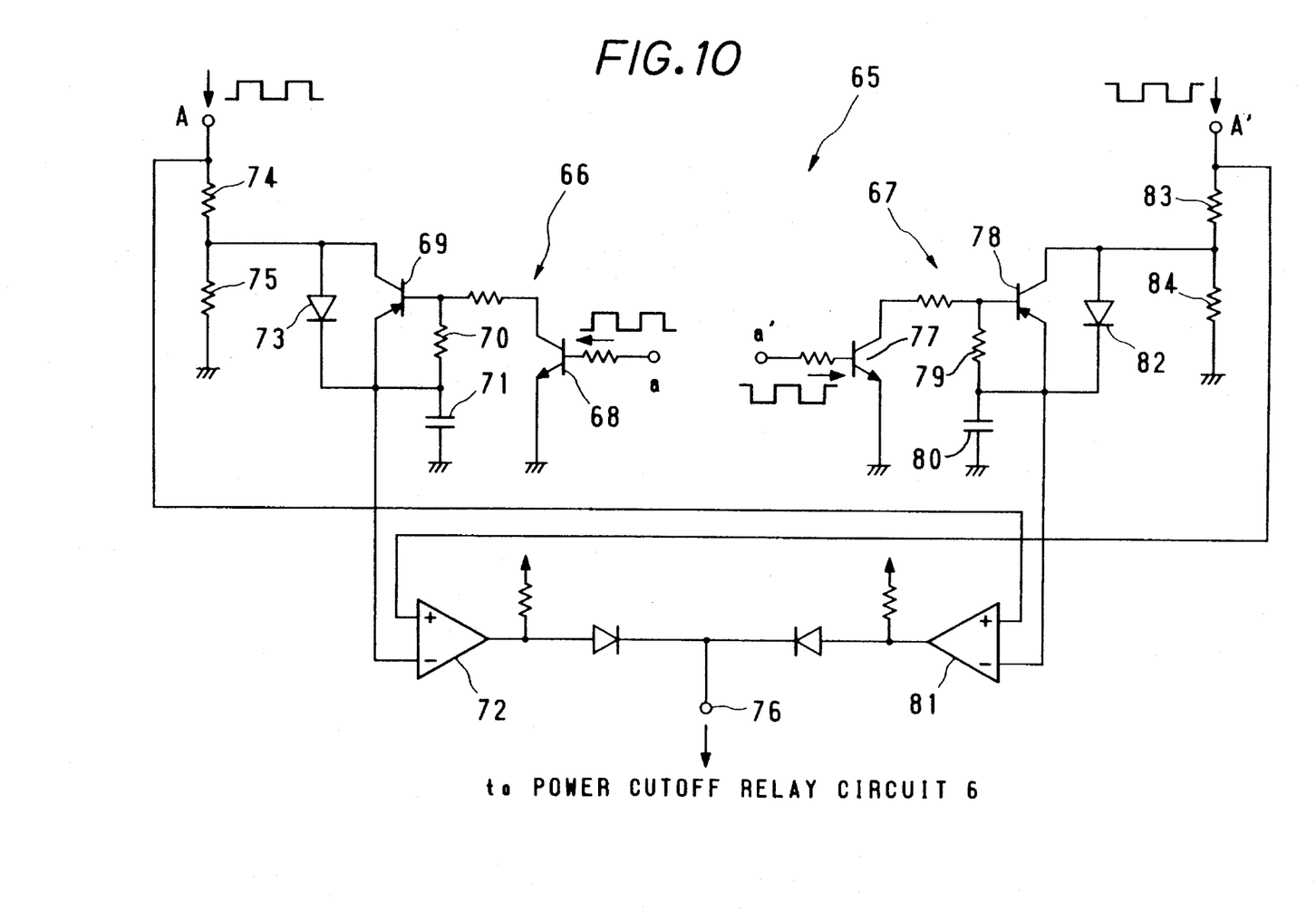
FIG. 10 is a diagram exemplifying the structure of an abnormality detector according to the second embodiment.

FIG. 10 shows an example of the structure of the abnormality detector 65, which comprises a circuit 66 for detecting the short-circuit on the point A side and a circuit 67 for detecting a short-circuit on the point A' side, both circuits having symmetrical structures.

The circuit 66 acquires a sampled and held voltage for the detected voltage V(A) and compares its level with the level of the detected voltage V(A').

The gate voltage (point a in FIG. 3) of the FET 29 of the bridge type driver 22, which is in phase with V(A), is supplied to the base of an emitter-grounded NPN transistor 68 whose collector is connected via a resistor to the base era PNP transistor 69.

A resistor 70 is provided between the base and emitter of the transistor 69, and the end of the resistor 70 on the opposite side of the base is grounded via a capacitor 7 I.

The terminal voltage of the capacitor 71 is sent to the inverting input terminal of and operational amplifier 72, which constitutes a comparator.

A diode 73 is provided between the emitter and collector of the transistor 69, and has an anode connected to the collector of the transistor 69 and a cathode connected to the emitter thereof.

Reference numerals "74" and "75" denote voltage-dividing resisters. The voltage at the point A is supplied to one end of the resistor 74 which has the other end connected to the collector of the transistor 69 and grounded via the resistor 75.

The voltage at the point A' is supplied to the non-inverting input terminal of the operational amplifier 72, and an output corresponding to the comparison of this voltage with the terminal voltage of the capacitor 71 is acquired via a diode from a detection output terminal 76.

Figure 11:
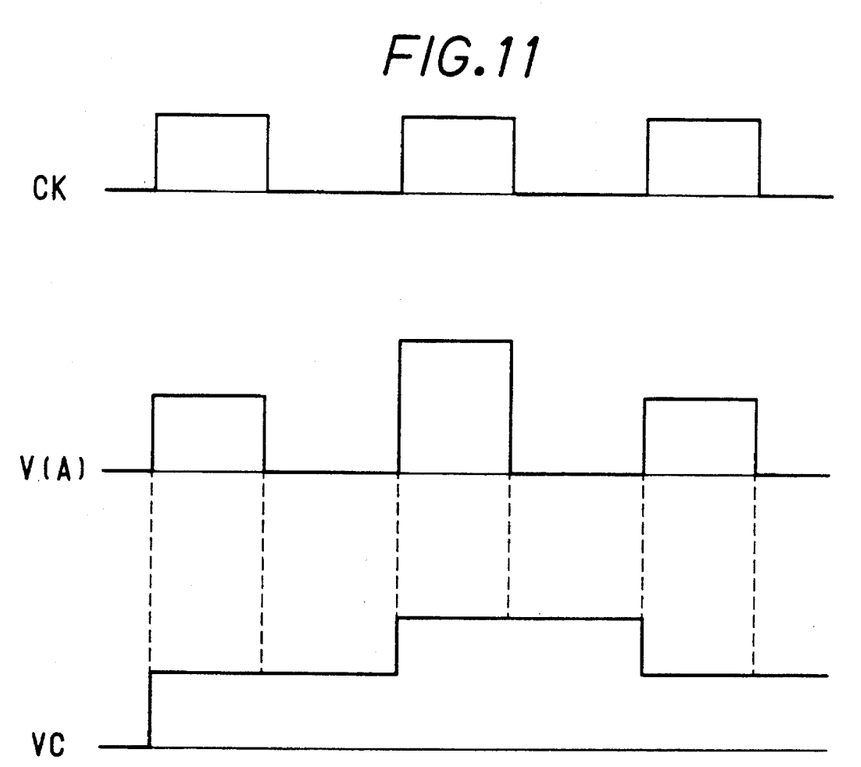
FIG. 11 is a time chart for explaining the operation of the abnormality detector shown in FIG. 10.

FIG. 11 illustrates waveforms at the individual sections which are used to explain the operation of the circuit 66, and shows the relationship between the input signal "CK" to the transistor 68, the detected voltage "V(A)" at the point A and the terminal voltage "VC" of the capacitor 71.

When the signal CK is an H level, the transistor 68 is turned on, ensuring the charging to the capacitor 71 via the resistor 74 and diode 75 from the point A and the discharging from the capacitor 71 via the transistor 68. Therefore, the terminal voltage of the capacitor 71 is defined by the potential at the point A.

When the signal CK is an L level, the transistor 68 is turned off, so that no charging or discharging of the capacitor 71 will be performed and the level of the terminal voltage will be held.

The terminal voltage VC of the capacitor 71 is therefore a sampled and held voltage and the short-circuit on the point A side can be detected by comparing its level with the level of V(A') to determine if VL<<VL'.

The circuit 67 which is associated with the detection of a short-circuit on the point A' side, acquires a sampled and held voltage for the detected voltage V(A') and compares its level with the level of the detected voltage V(A). The gate voltage (point a' in FIG. 3) of the FET 27 of the bridge type driver 22, which is in phase with V(A'), is supplied to the base of an emitter-grounded NPN transistor 77 whose collector is connected via a resistor to the base of a PNP transistor 78.

A resistor 79 is provided between the base and emitter of the transistor 78, and the end of the resistor 79 on the opposite side of the base is grounded via a capacitor 80. The terminal voltage of the capacitor 80 is sent to the inverting input terminal of an operational amplifier 81, which constitutes a comparator.

A diode 82 is provided between the emitter and collector of the transistor 78, and has an anode connected to the collector of the transistor 78 and a cathode connected to the emitter thereof.

Reference numerals "83" and "84" denote voltage-dividing resisters. The voltage at the point A' is supplied to one end of the resistor 83 which has the other end connected to the collector of the transistor 78 and grounded via the resistor 84.

The voltage at the point A is supplied to the non-inverting input terminal of the operational amplifier 81, and an output corresponding to the comparison of this voltage with the terminal voltage of the capacitor 80 is acquired via a diode from the detection output terminal 76.

It is apparent from the above description that the circuit 67 compares the sampled and held voltage of V(A) with V(A') to determine if VL'<<VL, thereby detecting a short-circuit on the point A' side.

The abnormality detection signals thus acquired are ORed by diodes and the resultant signal is sent to the power cutoff relay circuit 6 to be used to open the relay contact 6a.

Even when the lamp voltage increases due to an inductive lead component in the igniter circuit 9, the abnormality detector 65 can secure a wider detection margin to detect an abnormal status from the normal status and is not affected by the temperature characteristic of the FETs constituting the bridge type driver 22, thus ensuring the accurate detection of abnormality.

The circuits 66 and 67 may have any structure as long as each circuit is a combination of a sample and hold circuit and a comparator. The positions of detection may be changed to the points C and C' instead of the points A and A'.

In short, according to the present invention, the lamp voltage of a discharge lamp or its corresponding signal is always monitored and the detected level is compared with the level of a reference voltage or the detected levels acquired for the individual terminals of the discharge lamp are compared with each other, and power supply to the discharge lamp is cut off when an abnormal status is detected. It is therefore possible to prevent an abnormality-originated fire or a shock-oriented accident. Further, the status of the discharge lamp can be directly monitored to promptly detect the-occurrence of an abnormal status, thus ensuring accurate detection of abnormality.

Although only two embodiments of the present invention have been described herein, it should be apparent to those skilled in the art that the present invention may be embodied in many other specific forms without departing flora the spirit or scope of the invention. For instance, although the present invention is applied to a lighting circuit of a rectangular-wave triggering system, this invention is not limited to this particular type, but a sine-wave triggering lighting circuit or the like may also be adapted.

What is claimed is:

1. A lighting circuit for a vehicular discharge lamp comprising:

DC/AC converting means for converting a DC voltage into an AC voltage before and supplying said AC voltage to a discharge lamp;

abnormality detecting means for detecting a level of a lamp voltage of said discharge lamp at a point between an AC voltage output of said DC/AC converting means and said discharge lamp, and comparing said detected level with a level of a predetermined reference voltage to thereby discriminate an abnormal status of said discharge lamp and to thereby produce a signal indicating an abnormal status, and power cutoff means for cutting off power supply to said discharge lamp when receiving a signal indicating an abnormal status from said abnormality detecting means.

2. A lighting circuit for a vehicular discharge lamp comprising:

DC/AC converting means for converting a DC voltage into an AC voltage before and supplying said AC voltage to a discharge lamp;

abnormality detecting means for detecting a level of a lamp voltage of said discharge lamp at a point between an AC voltage output of said DC/AC converting means and said discharge lamp, and comparing detected levels acquired for individual terminals of said discharge lamp with each other to thereby discriminate an abnormal status of said discharge lamp and to thereby produce a signal indicating an abnormal status; and power cutoff means for cutting off power supply to said discharge lamp when receiving said signal indicating an abnormal status from said abnormality detecting means.

3. The lighting circuit according to claim 1, further comprising a DC booster circuit for boosting an input DC voltage, an igniter circuit, and said discharge lamp, whereby said DC/AC converting means converts an output DC voltage from said DC booster circuit into an AC voltage of a rectangular waveform.

4. The lighting circuit according to claim 2, further comprising a DC booster circuit for boosting an input DC voltage, an igniter circuit, and said discharge lamp, whereby said DC/AC converting means converts an output DC voltage from said DC booster circuit into an AC voltage of a rectangular waveform.

5. The lighting circuit according to claim 3, wherein said DC/AC converting means includes a bridge type driver having field effect transistors, and a drive controller for sending a switching control signal to said field effect transistors, said bridge type driver receiving said output DC voltage from said DC booster circuit.

6. The fighting circuit according to claim 4, wherein said DC/AC converting means includes a bridge type driver having field effect transistors, and a drive controller for sending a switching control signal to said field effect transistors, said bridge type driver receiving said output DC voltage from said DC booster circuit.

7. The lighting circuit according to claim 3, wherein said abnormality detecting means comprises a level discriminating section for detecting an abnormal status of said discharge lamp.

8. The lighting circuit according to claim 7, wherein said level discriminating section includes voltage-dividing means for dividing an output voltage of said DC/AC converting means, and an operational amplifier having an inverting input terminal supplied with said voltage-divided output voltage of said DC/AC converting means and a non-inverting input terminal supplied with a predetermined reference voltage.

9. The lighting circuit according to claim 4, wherein said abnormality detecting means comprises a level discriminating section for detecting an abnormal status of said discharge lamp.

10. The lighting circuit according to claim 9, wherein said level discriminating section includes voltage-dividing means for dividing an output voltage of said DC/AC converting means, and an operational amplifier having an inverting input terminal supplied with said voltage-divided output voltage of said DC/AC converting means and a non-inverting input terminal supplied with a predetermined reference voltage.

11. The lighting circuit according to claim 3, wherein said power cutoff means includes a power cutoff relay circuit having a relay contact for cutting off power supply to a circuit at a subsequent stage when abnormality is detected.

12. The lighting circuit according to claim 4, wherein said power cutoff means includes a power cutoff relay circuit having a relay contact for cutting off power supply to a circuit at a subsequent stage when abnormality is detected.

13. The lighting circuit according to claim 1, wherein said abnormality detecting means detects a signal corresponding to said level of said lamp voltage.

14. The lighting circuit according to claim 1, wherein said abnormality detecting means comprises means for checking if said detected level falls within a predetermined reference range to thereby discriminate said abnormal status of said discharge lamp.

15. The lighting circuit according to claim 2, wherein said abnormality detecting means detects a signal corresponding to said level of said lamp voltage.

* * * * *